(12) United States Patent
White

(10) Patent No.: US 10,189,392 B2
(45) Date of Patent: Jan. 29, 2019

(54) VEHICLE CENTER CONSOLE WORKING SURFACE

(71) Applicant: Ford Global Technologies, LLC, Dearborn, MI (US)

(72) Inventor: John Q. White, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 33 days.

(21) Appl. No.: 15/589,248

(22) Filed: May 8, 2017

(65) Prior Publication Data

US 2018/0319305 A1 Nov. 8, 2018

(51) Int. Cl.
*B60N 3/00* (2006.01)
*B60R 7/04* (2006.01)
*B60N 3/10* (2006.01)

(52) U.S. Cl.
CPC ............... *B60N 3/002* (2013.01); *B60N 3/00* (2013.01); *B60N 3/10* (2013.01); *B60R 7/04* (2013.01)

(58) Field of Classification Search
CPC .......... B60R 7/04; B60N 3/10; B60N 2/4686; B60N 2/468; B60N 3/002; B60N 3/00
USPC ...................................................... 296/24.34
See application file for complete search history.

(56) References Cited

U.S. PATENT DOCUMENTS

| | | |
|---|---|---|
| 2,522,602 A | 9/1950 | Burns |
| 3,345,118 A | 10/1967 | Cummings |
| 3,408,104 A | 10/1968 | Raynes |
| 3,423,785 A | 1/1969 | Pickles |
| 3,641,946 A | 2/1972 | Charnay |
| 4,025,109 A | 5/1977 | Klingelhofer et al. |
| 4,359,004 A | 11/1982 | Chappell |
| 4,566,150 A | 1/1986 | Boothe |
| 5,788,325 A | 8/1998 | Ganot |
| 6,032,587 A * | 3/2000 | Salenbauch ............ B60N 3/002 108/44 |
| 6,325,458 B1 | 12/2001 | Rohee et al. |
| 6,394,551 B1 | 5/2002 | Beukema |
| 6,929,304 B1 * | 8/2005 | Dry ......................... A47C 7/72 224/539 |
| 7,303,226 B2 | 12/2007 | Bernstein et al. |
| 7,607,726 B2 | 10/2009 | Orlo et al. |
| 7,793,597 B2 | 9/2010 | Bart et al. |
| 8,167,366 B2 | 5/2012 | Charpentier et al. |
| 8,899,651 B2 * | 12/2014 | Schulz ................... B60N 3/102 296/24.34 |
| 2002/0140246 A1 * | 10/2002 | Worrell .................... B60N 2/26 296/37.8 |
| 2006/0091169 A1 * | 5/2006 | Lippert ................... B60R 7/043 224/275 |
| 2006/0208517 A1 * | 9/2006 | Nakamura ................ B60R 7/04 296/37.1 |
| 2006/0220425 A1 * | 10/2006 | Becker ...................... A47C 7/70 297/188.16 |
| 2007/0069544 A1 * | 3/2007 | Sturt ....................... B60N 2/793 296/37.8 |

(Continued)

*Primary Examiner* — Jason S Morrow
(74) *Attorney, Agent, or Firm* — Vichit Chea; Price Heneveld LLP

(57) ABSTRACT

A center console for a vehicle includes a lid and a pivoting assembly. The pivoting assembly includes a working surface. The working surface is deployable while the lid is in a closed position. The pivoting assembly is independently operable from the lid.

18 Claims, 11 Drawing Sheets

(56) References Cited

U.S. PATENT DOCUMENTS

| | | | |
|---|---|---|---|
| 2010/0201147 A1* | 8/2010 | Jones | B60R 7/04 |
| | | | 296/24.34 |
| 2011/0048289 A1 | 3/2011 | Pietila et al. | |
| 2015/0267757 A1 | 9/2015 | Garing et al. | |
| 2018/0170232 A1* | 6/2018 | Huebner | B60N 3/001 |

* cited by examiner

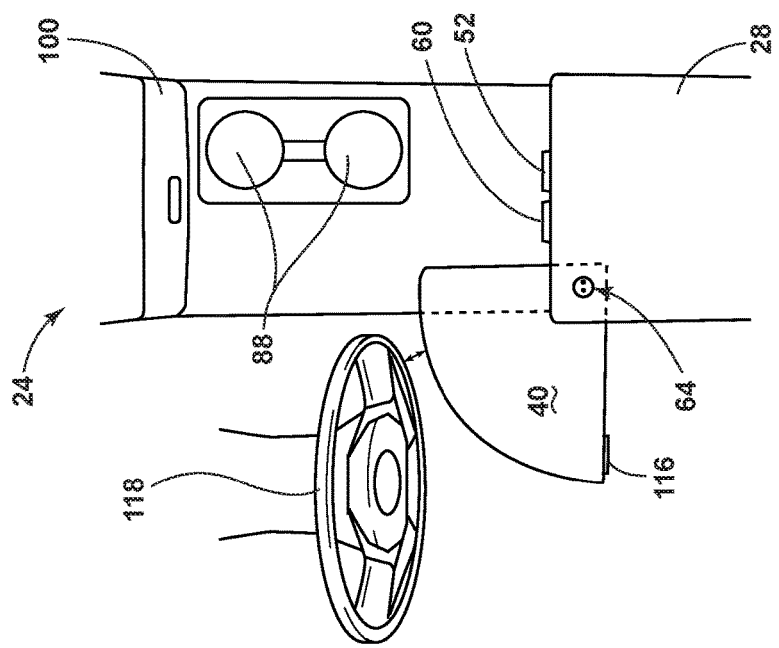
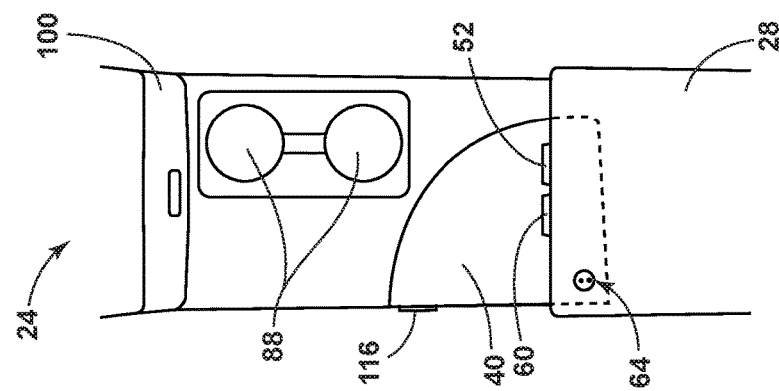
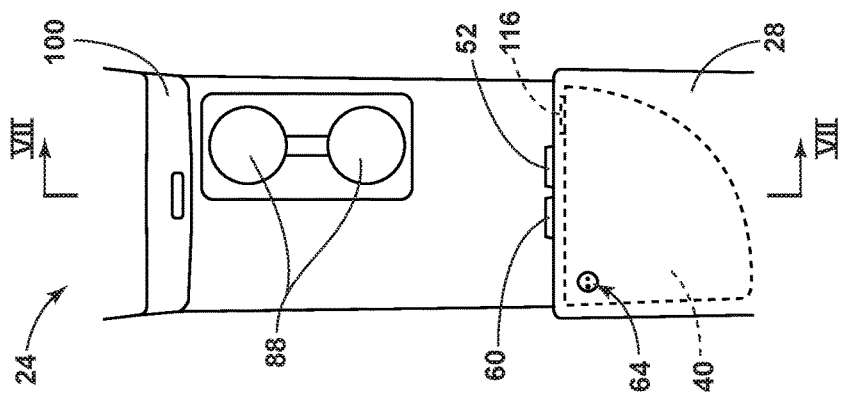
FIG. 6
FIG. 5
FIG. 4

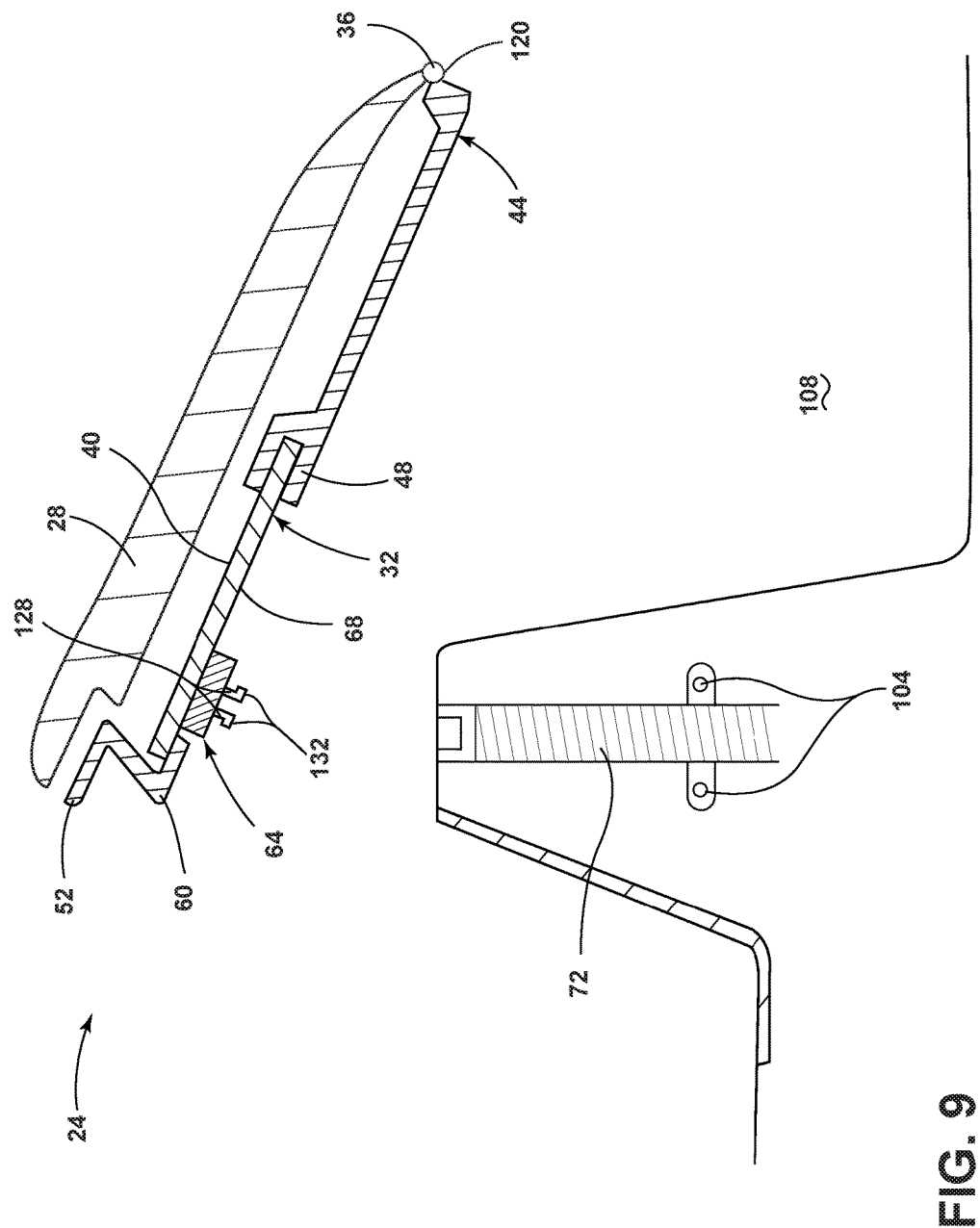

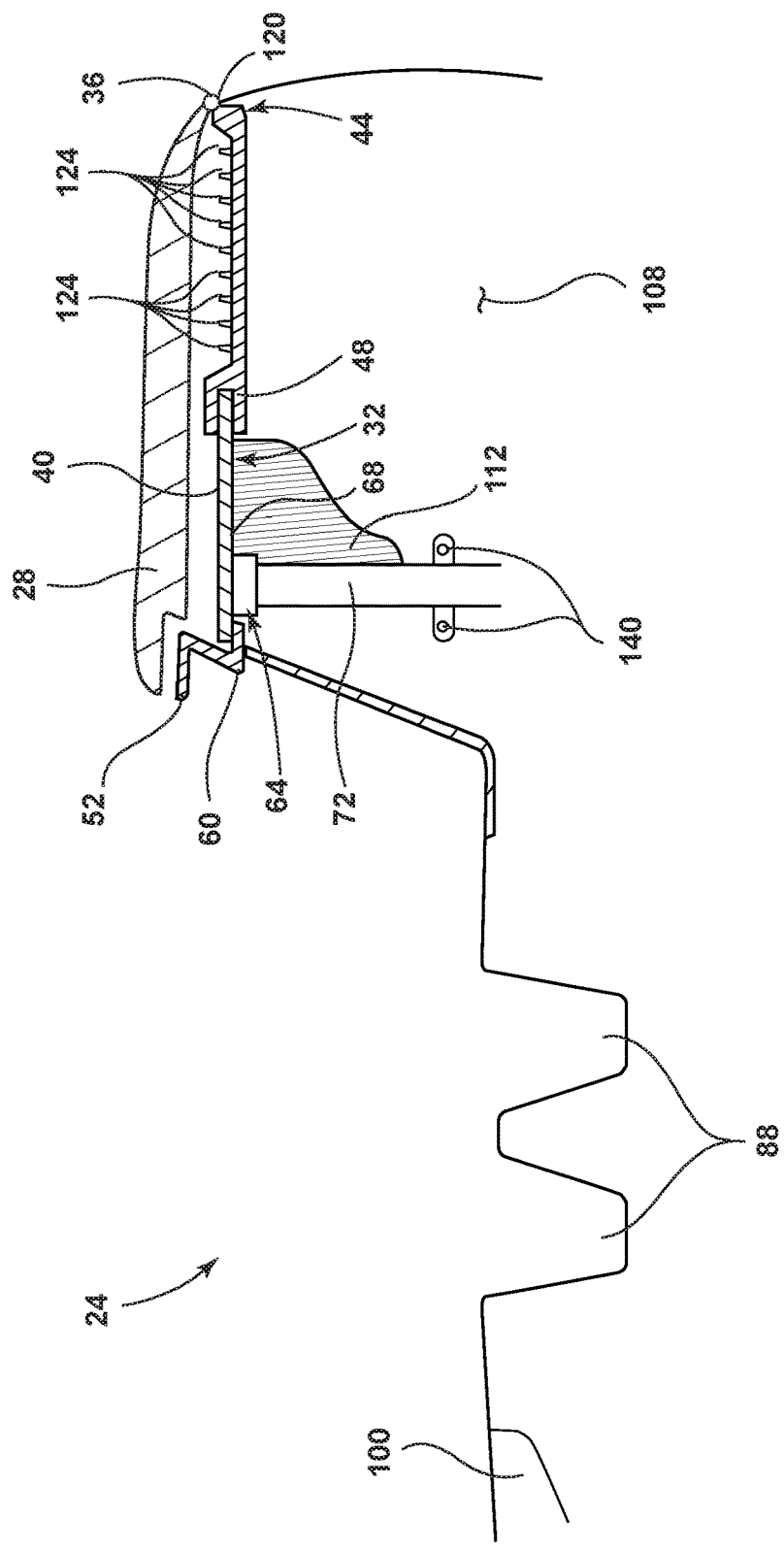

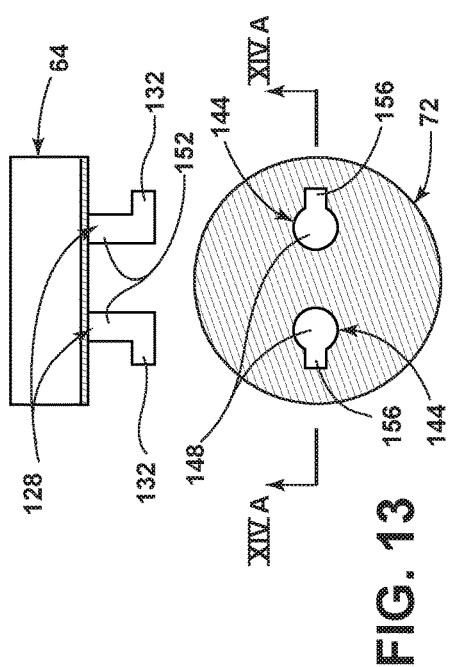
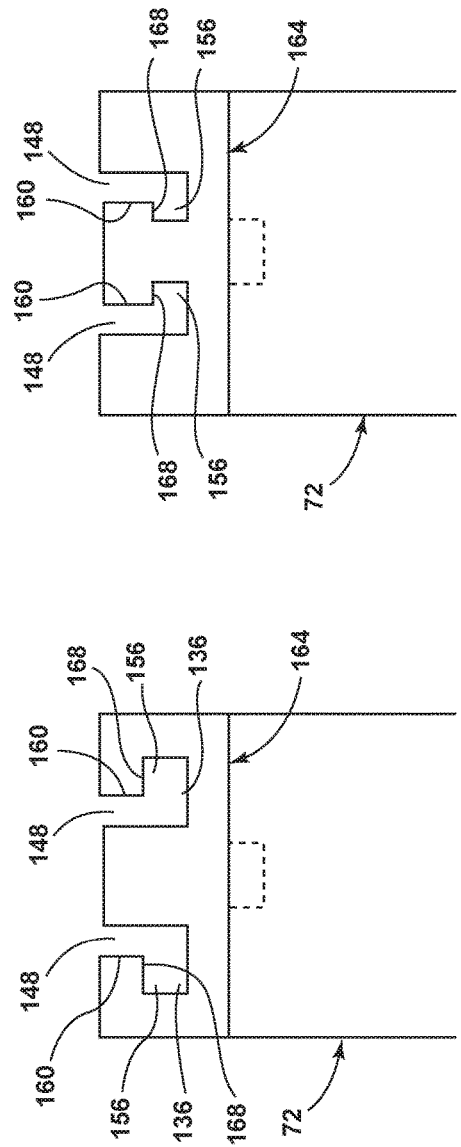

VEHICLE CENTER CONSOLE WORKING SURFACE

FIELD OF THE DISCLOSURE

The present disclosure generally relates to a vehicle center console. More specifically, the present disclosure relates to a working surface for a vehicle center console.

BACKGROUND OF THE INVENTION

Vehicles are typically provided with a center console that may additionally serve as an armrest. These center consoles often provide a storage compartment for a user. Some vehicles are provided with a working surface located in a cabin of a vehicle. However, a working surface is needed that provides additional functionality to the vehicle without impeding storage or occupancy capabilities of the vehicle.

SUMMARY OF THE INVENTION

According to a first aspect of the present disclosure, a center console for a vehicle includes a lid and a pivoting assembly. The pivoting assembly includes a working surface that is deployable while the lid is in a closed position. The pivoting assembly is independently operable from the lid.

Embodiments of the first aspect of the present disclosure can include any one or a combination of the following features:
  the pivoting assembly further includes a storage tray that is forked at a forward extreme to receive the working surface when the working surface is in a stowed position, wherein the storage tray is pivotably coupled to the center console at a forward extreme;
  the center console further includes a pivot block operably coupled to an underside of the working surface and configured to releasably engage with a support shaft to permit opening of the pivoting assembly and rotational deployment of the working surface;
  the center console further includes a structural support operably coupled to the underside of the working surface that rotates with the working surface when the working surface is transitioned between a stowed position and a deployed position;
  the pivot block further includes one or more spring-loaded pins that releasably engage with the support shaft;
  an underside of the pivot block is magnetic and the support shaft is made of a ferromagnetic material.
  the spring-loaded pins include radially protruding portions that positively engage with a channel in the support shaft to retain the pivot block to the support shaft;
  the support shaft is rotatable about an axis through a geometric center of the support shaft;
  the center console further includes a first release lever operably coupled to the lid and configured for releasable engagement with a latch;
  the center console further includes a second release lever operably coupled to the pivoting assembly and configured for releasable engagement with the latch; and
  the lid further includes a supplemental storage area therein configured to retain items while the lid is transitioned between an open and the closed position.

According to a second aspect of the present disclosure, a center console for a vehicle includes a lid and a pivoting assembly operably coupled to the lid. The pivoting assembly includes a working surface and a storage tray. The storage tray is forked at a forward extreme to receive the working surface in a stowed position. A pivot block is operably coupled to an underside of the working surface and configured to releasably engage with a support shaft.

Embodiments of the second aspect of the present disclosure can include any one or a combination of the following features:
  the center console further includes a structural support operably coupled to the underside of the working surface that rotates with the working surface when the working surface is transitioned between the stowed position and a deployed position;
  the pivot block further includes one or more spring-loaded pins that releasably engage with the support shaft;
  an underside of the pivot block is magnetic and the support shaft is made of a ferromagnetic material; and
  the spring-loaded pins comprise radially protruding portions that positively engage with a channel in the support shaft to retain the pivot block to the support shaft.

According to a third aspect of the present disclosure, a center console for a vehicle includes a lid and a pivoting assembly operably coupled to the lid at a rearward end. The pivoting assembly includes a working surface and a storage tray. The storage tray is forked at a forward extreme to receive the working surface in a stowed position. The working surface can remain in a deployed position when the lid and pivoting assembly are closed. A first release lever is configured for releasable engagement with a latch. A second release lever is configured for releasable engagement with the latch. A pivot block is operably coupled to an underside of the working surface and configured to releasably engage with a support shaft.

Embodiments of the third aspect of the present disclosure can include any one or a combination of the following features:
  the pivot block further includes one or more spring-loaded pins that releasably engage with the support shaft;
  an underside of the pivot block is magnetic and the support shaft is made of a ferromagnetic material; and
  the spring-loaded pins include radially protruding portions that positively engage with a channel in the support shaft to retain the pivot block to the support shaft.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 4 is a top view of a center console with the working surface shown in a stowed position;

FIG. 5 is a top view of a center console with the working surface shown in a partially deployed position;

FIG. 6 is a top view of a center console with the working surface shown in a fully deployed position;

FIG. 9 is a side cross-sectional view of the center console taken along line VII-VII of FIG. 4 with a lid in an open position, according to one embodiment;

FIG. 10 is a side cross-sectional view of the center console taken along line VII-VII of FIG. 4, according to yet another embodiment;

FIG. 13 is a side view of a pivot block and a top view of a support shaft with which the pivot block engages, according to one embodiment;

FIG. 14A is a cross-sectional view of the support shaft taken along line XIVA-XIVA of FIG. 13, according to one embodiment; and FIG. 14B is a cross-sectional view of the support shaft taken along line XIVA-XIVA of FIG. 13, according to another embodiment.

DETAILED DESCRIPTION OF THE PREFERRED EMBODIMENTS

Figure 1:
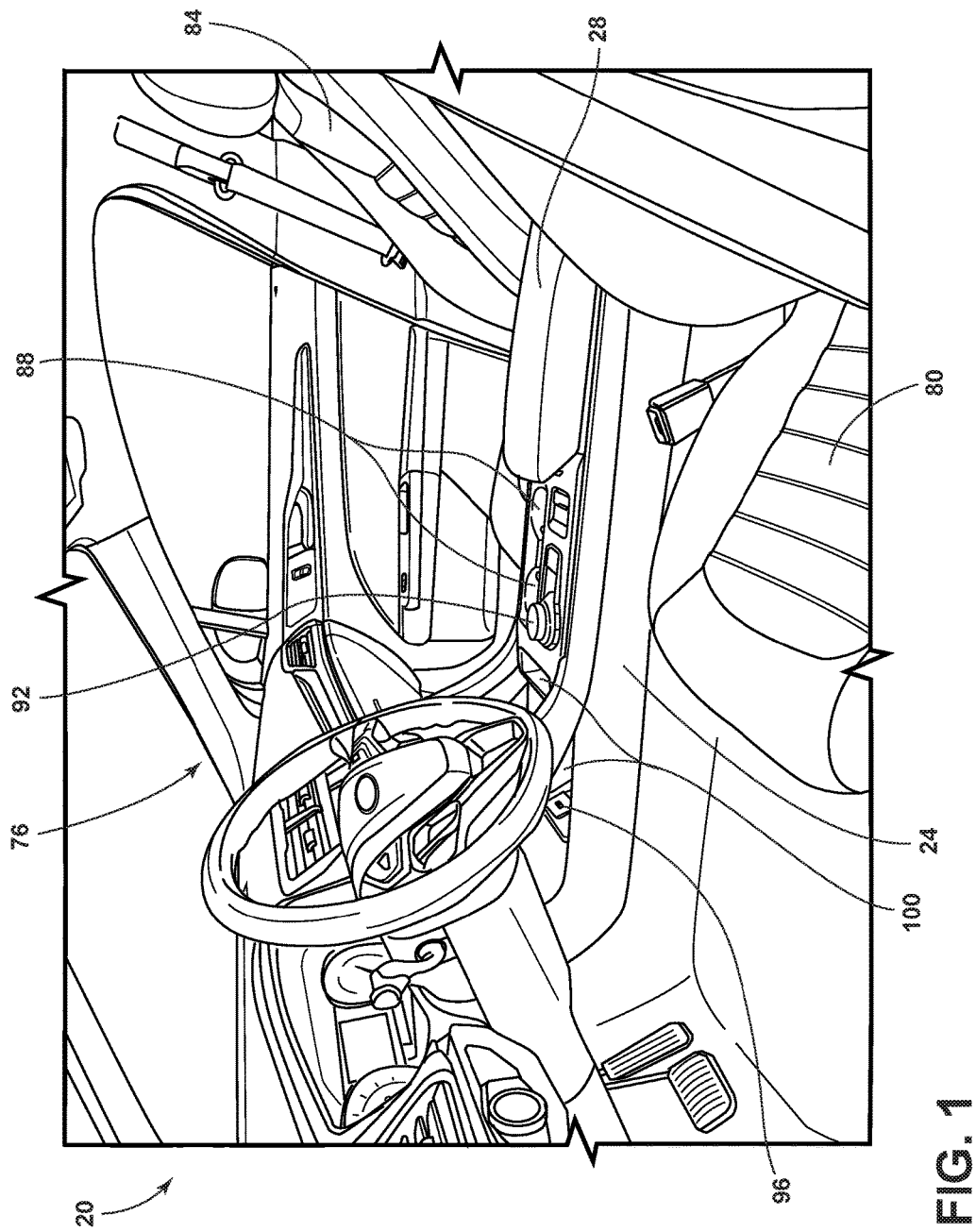
FIG. 1 is a side perspective view of an interior of a vehicle illustrating a center console having a lid and a pivoting assembly with a working surface.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a center console. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-14B, reference numeral 20 generally designates a vehicle. A center console 24 for the vehicle 20 includes a lid 28 and a pivoting assembly 32 operably coupled to the lid 28 at a rearward end 36, according to one embodiment. The lid 28 and the pivoting assembly 32 may be alternatively coupled to the center console 24, for example the lid 28 and the pivoting assembly 32 may be operably coupled to a side or front end of the center console 24. The pivoting assembly 32 includes a working surface 40 and a storage tray 44. The storage tray 44 is forked at a forward extreme 48 to receive the working surface 40 in a stowed position (FIG. 4). The working surface 40 can remain in a deployed position (FIG. 5) when the lid 28 and pivoting assembly 32 are closed. Further, the working surface 40 can be deployed from the stowed position while the lid 28 is in the closed position. A first release lever 52 is configured for releasable engagement with a latch 56. A second release lever 60 is configured for releasable engagement with the latch 56. A pivot block 64 is operably coupled to an underside 68 of the working surface 40 and configured to releasably engage with a support shaft 72.

Referring again to FIG. 1, an interior 76 of the vehicle 20 often includes a driver seat 80 and a passenger 84 positioned on either side of the center console 24. The center console 24 may include various functionalities such as, one or more cup holders 88, a gear shifting mechanism 92, a multimedia outlet 96 that may additionally provide power to an electronic device, and one or more storage areas 100.

Figure 2:
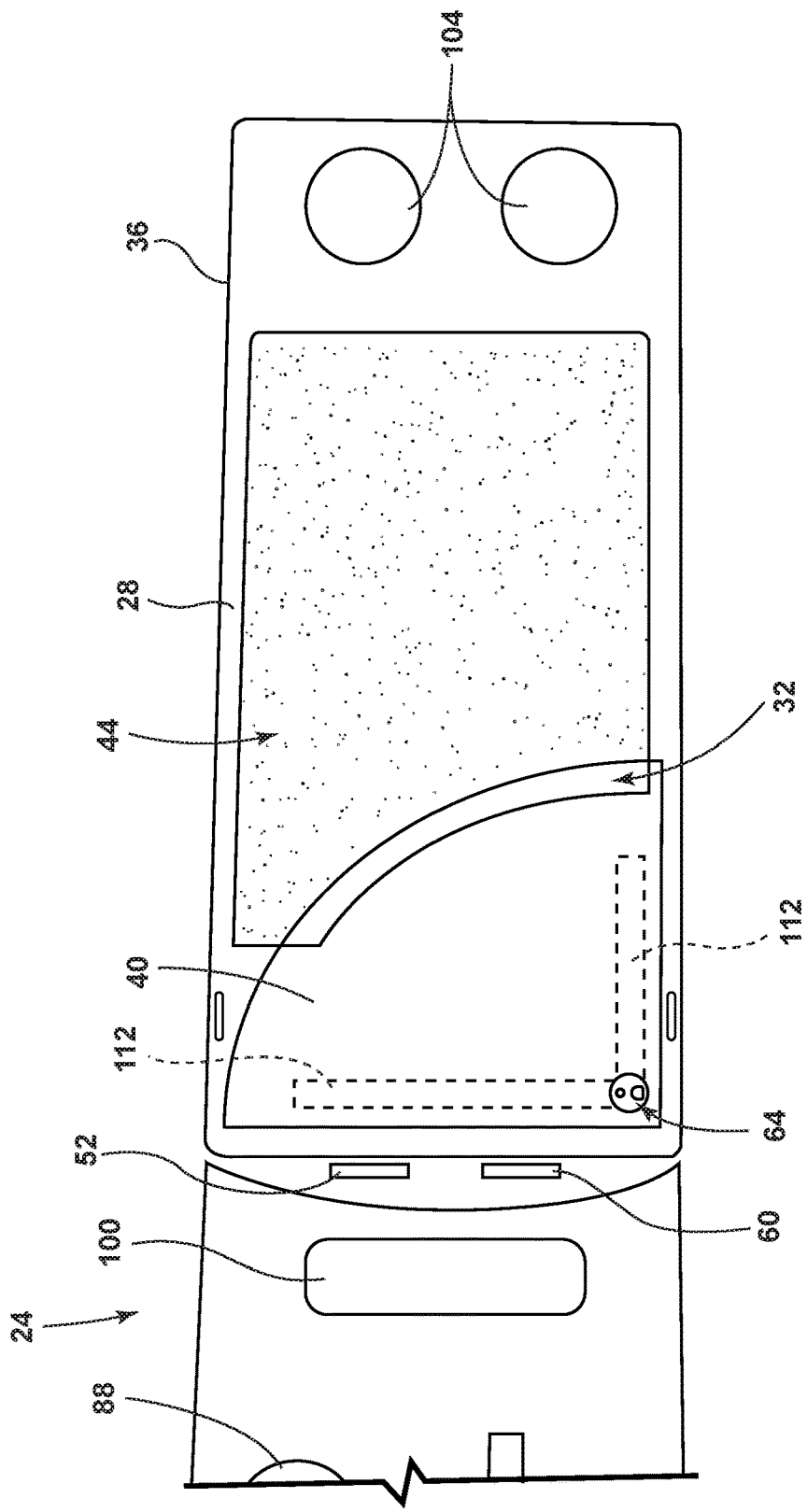
FIG. 2 is a top view of the center console, according to one embodiment, illustrating the working surface and a storage tray of a pivoting assembly.
Figure 3:
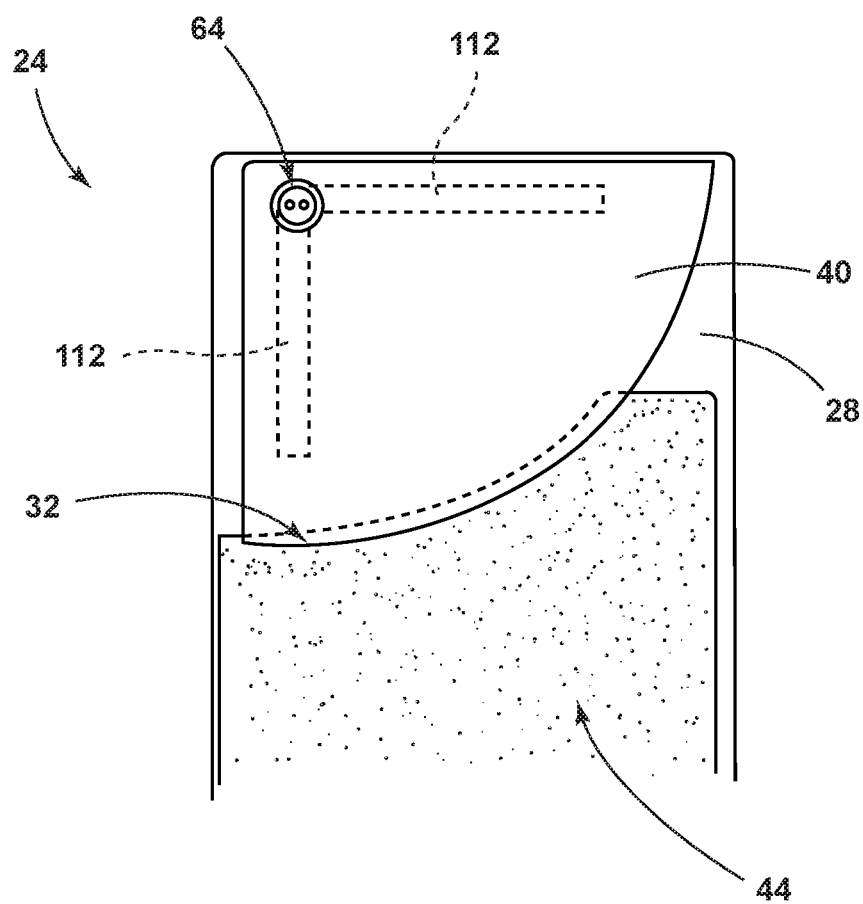
FIG. 3 is a top view of the working surface and the storage tray within the center console.
Figure 7:
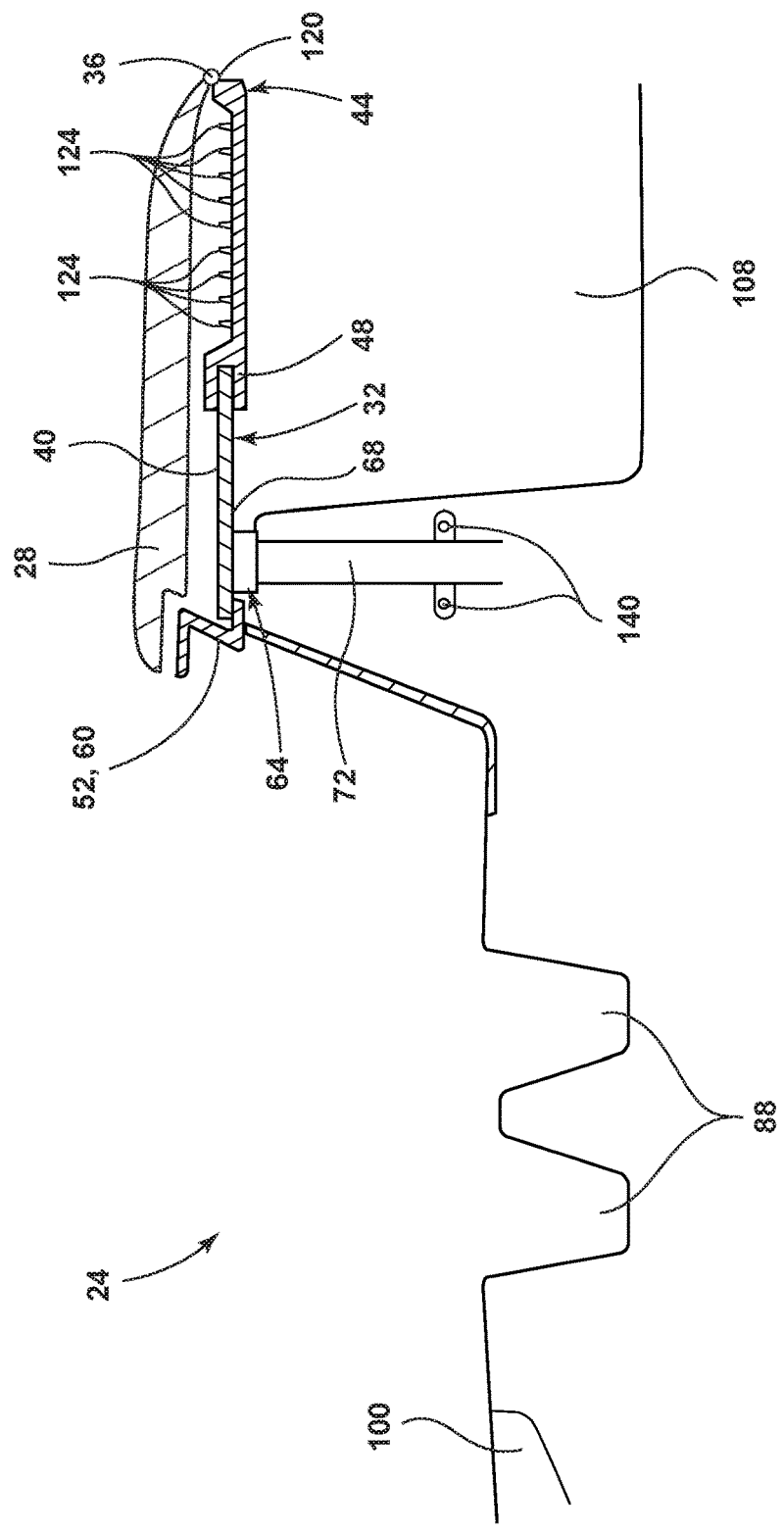
FIG. 7 is a side cross-sectional view of the center console taken along line VII-VII of FIG. 4, according to one embodiment.

Referring to FIGS. 2 and 3, the center console 24 may include beverage holders 104 that are positioned on a rearward portion of the center console 24 such that rearward passengers may utilize the beverage holders 104. The center console 24 may further include a main storage bin 108 (FIG. 7). The lid 28 conceals the pivoting assembly 32 and the main storage bin 108. The pivoting assembly 32 includes the working surface 40 and the storage tray 44. The forward extreme 48 of the storage tray 44 may be forked to receive the working surface 40 when the working surface 40 is placed in a stowed position. The working surface 40 may releasably engage with the support shaft 72. The working surface 40 may further include a structural support 112 that is operably coupled to the underside 68 (FIG. 7) of the working surface 40. The structural support 112 may be configured to rotate with the working surface 40 as the working surface 40 transitions between the stowed position and the deployed position. The structural support 112 may be operably coupled to the structural support 112 and/or the pivot block 64 (FIG. 7).

Referring now to FIGS. 4-6, the working surface 40 can be transitioned from the stowed position (FIG. 4) by pulling on a tab 116 that is operably coupled to the underside 68 of the working surface 40. The tab 116 remains accessible to a user independent of the positioning of the lid 28. In other words, the tab 116 may be accessed by the user while the lid 28 is in either the open or closed position. Accordingly, the working surface 40 may be deployed from the stowed position while the lid 28 is in the closed position. While transitioning from the stowed position the working surface 40 may be placed in a partially deployed position, such as that shown in FIG. 5. When in the partially deployed position the working surface 40 is configured to permit access to other functionalities of the center console 24, for example, permitting access to the cup holders 88. When the working surface 40 is placed in a fully deployed position, such as that shown in FIG. 6, the working surface 40 is configured to provide clearance between the working surface 40 and a steering wheel 118 such that the user need not adjust the positioning of the steering wheel 118 in order to use the working surface 40.

Referring to FIGS. 7-10, various embodiments of the center console 24 are illustrated in further detail. The lid 28 is shown operably coupled to the center console 24 at the rearward end 36 for example, by a hinge 120. The lid 28 may include a supplemental storage area 122 therein that is configured to retain items while the lid 28 is transitioned between the open and closed positions. The pivoting assembly 32 is operably coupled to the center console 24 at the rearward end 36 for example, by the hinge 120. The lid 28 and the pivoting assembly 32 may be operably coupled to the center console 24 by a common pivoting mechanism such as, the hinge 120. While the lid 28 and the pivoting assembly 32 may be operably coupled to one another at the rearward end 36, the lid 28 and the pivoting assembly 32 are independently operable such that the lid 28 may be opened independently of the pivoting assembly 32. However, the lid 28 and the pivoting assembly 32 may be simultaneously opened to expose the main storage bin 108. Such operation of the lid 28 and the pivoting assembly 32 is accomplished by the first release lever 52 and the second release lever 60.

Figure 8A:
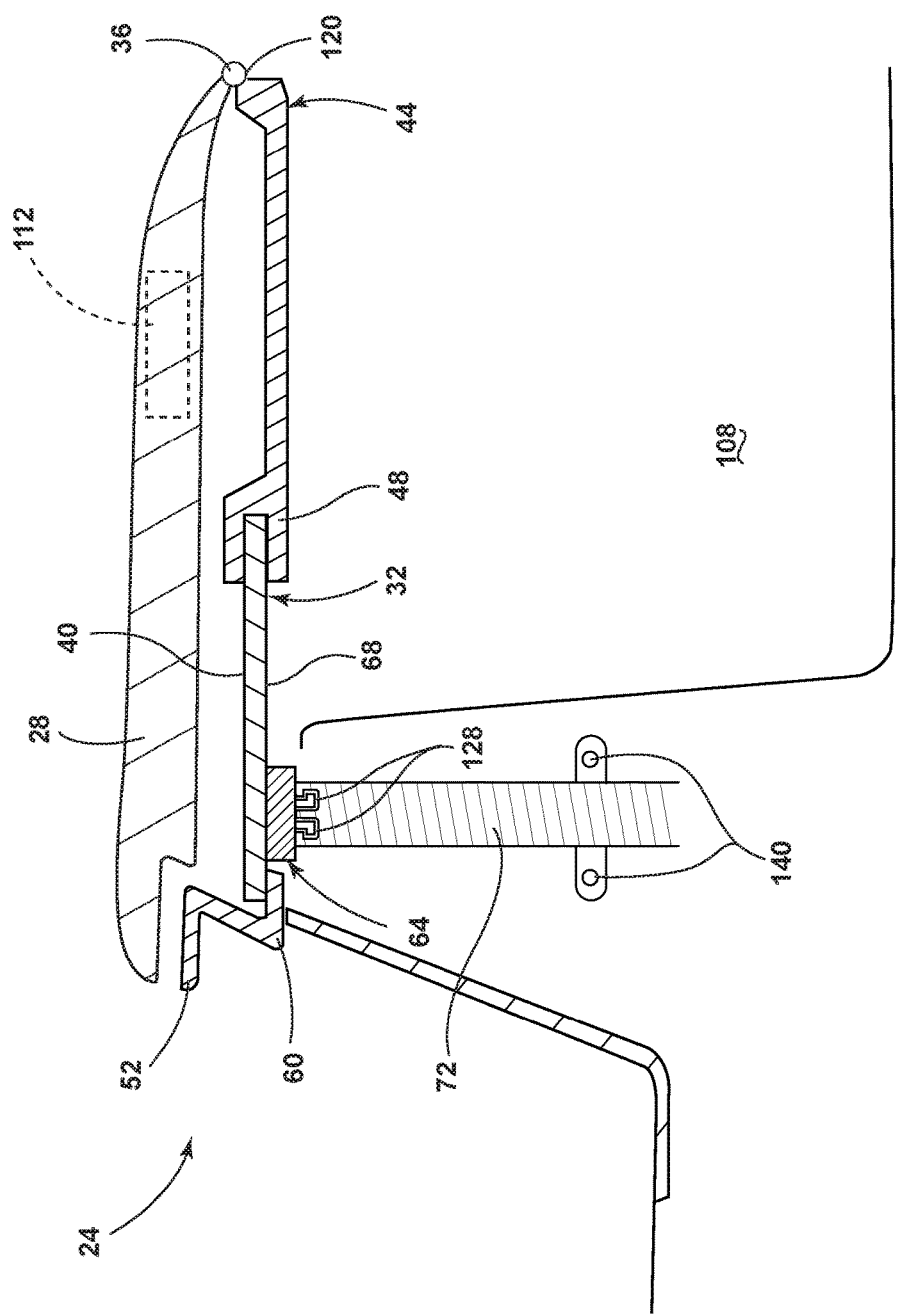
FIG. 8A is a side cross-sectional view of the center console taken along line VII-VII of FIG. 4, according to another embodiment.
Figure 8B:
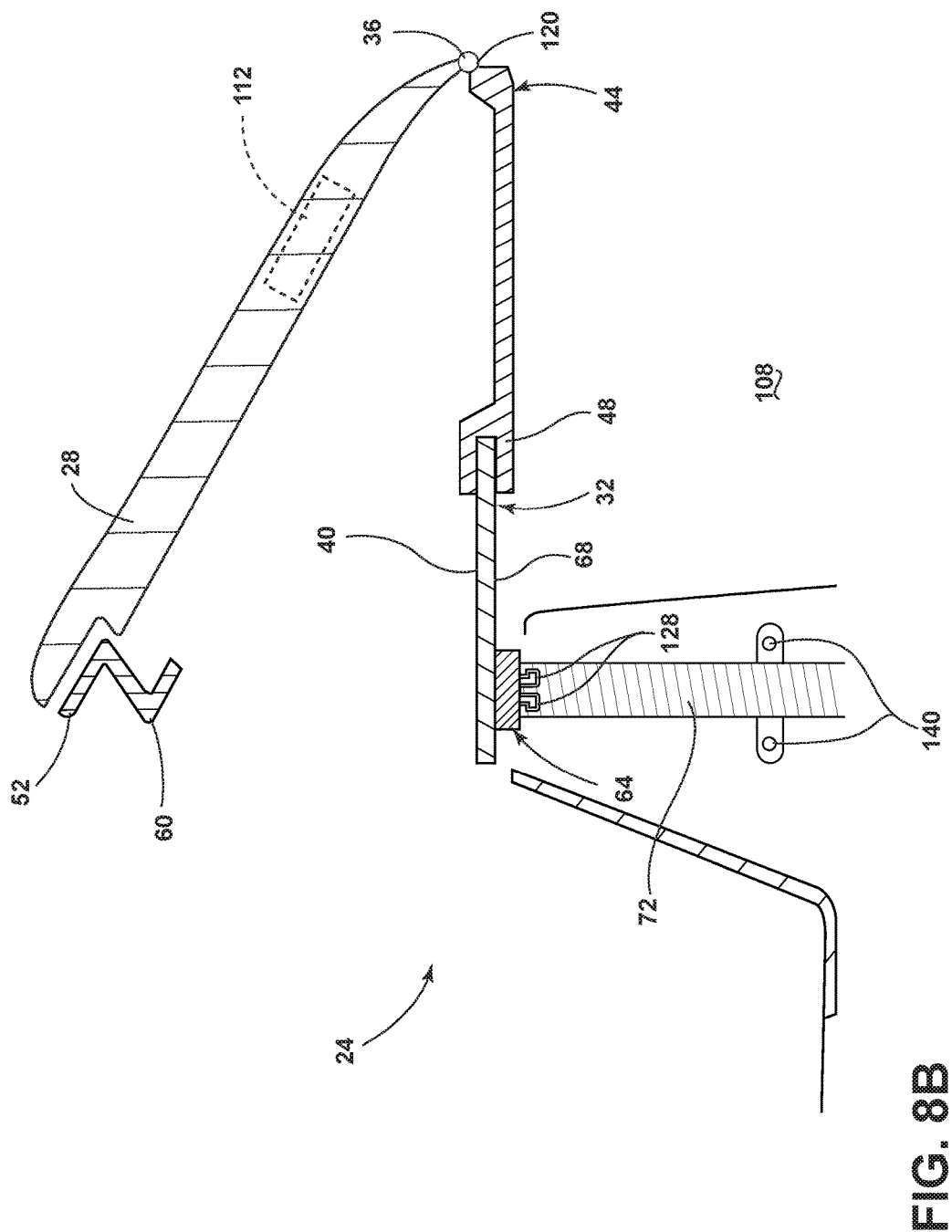
FIG. 8B is a side cross-sectional view of the center console taken along line VII-VII of FIG. 4 illustrating a lid in an open position, according to one embodiment.

Referring again to FIGS. 7-10, the first release lever 52 is operably coupled to the lid 28 and configured for releasable engagement with the latch 56. Actuation of the first release lever 52 disengages the first release lever 52 from the latch 56 and allows the lid 28 to be pivoted in an upward direction independent from the pivoting assembly 32. In other words, actuation of the first release lever 52 disengages the first release lever 52 from the latch 56 and allows the lid 28 to pivot in an upward direction while the working surface 40 and the storage tray 44 remain in a horizontal position. The first release lever 52 pivots upward with the lid 28. The second release lever 60 may also pivot upward with first release lever 52 and the lid 28 while the working surface 40 and the storage tray 44 remain in the horizontal position (FIG. 8B). The second release lever is operably coupled to the pivoting assembly 32 and configured for releasable engagement with the latch 56. Actuation of the second release lever 60 disengages the pivot block 64 from the support shaft 72 while simultaneously disengaging the first release lever 52 from the latch 56. Therefore, actuation of the second release lever 60 allows the pivoting assembly 32 and the lid 28 to be pivoted in an upward direction simultaneously such that the main storage bin 108 of the center console 24 is exposed so that the user may access the main storage bin 108, as shown in FIG. 9. The storage tray 44 of the pivoting assembly 32 may be forked at the forward extreme 48 to receive the working surface 40 when the working surface 40 is placed in the stowed position. While the forward extreme 48 is shown as being forked to receive the working surface 40 it is contemplated that the forward extreme 48 of the storage tray 44 may be alternatively configured while still engaging with the working surface 40 when the working surface 40 is in the stowed position. For example, the working surface 40 may engage with an underside of the storage tray 44 so as to transmit upward motion applied to the working surface 40 to the storage tray 44 such that the entire pivoting assembly 32 may be pivoted in an upward direction to expose the main storage bin 108. Alternatively, the working surface 40 may engage with an upper surface of the storage tray 44 such that actuation of the second release lever 60 allows for upward motion of the lid 28 and the working surface 40 while maintaining the storage tray 44 in a horizontal position. In such an embodiment, the storage tray 44 may be independently pivoted in an upward direction when the lid 28 and the working surface 40 have been rotated to expose the storage tray 44 and the main storage bin 108. Accordingly, the storage tray 44 may be independently pivoted in an upward direction to fully expose the main storage bin 108 after the lid 28 and the working surface 40 have been previously pivoted in an upward direction. The storage tray 44 may additionally include a series of protrusions 124 that may be used to hold and/or retain specific items such as, compact disc cases, electronic devices, sunglasses, wallets, and the like.

Referring further to FIGS. 7-10, the pivot block 64 is illustrated operably coupled to the underside 68 of the working surface 40. The pivot block 64 can further include one or more spring-loaded pins 128 that are configured to releasably engage with the support shaft 72. The spring-loaded pins 128 may include radially protruding portions 132 that positively engage with a channel 136 (FIGS. 14A and 14B) in the support shaft 72 to retain the pivot block 64 to the support shaft 72. The pivot block 64 rotates with the working surface 40 as the working surface 40 is transitioned between the stowed position and the fully deployed position. The radially protruding portions 132 may extend radially outward from a center of the pivot block 64 and/or radially inward toward the center of the pivot block 64. Actuation of the second release lever 60 may retract the spring-loaded pins 128 from the support shaft 72 to disengage the positive retention of the pivot block 64 to the support shaft 72 such that upward pivotable motion of the pivoting assembly 32 and the lid 28 is permitted. The support shaft 72 is operably coupled to the center console 24 by one or more fasteners 140. The operable coupling of the support shaft 72 to the center console 24 may fixedly couple the support shaft 72 to the center console 24. Alternatively, the operable coupling of the support shaft 72 to the center console 24 may permit rotational motion of the support shaft 72 about an axis through a geometric center of the support shaft 72. In such an embodiment, the support shaft 72 rotates with the pivot block 64 as the working surface 40 is transitioned between the stowed position and the fully deployed position.

Referring still further to FIGS. 7-10, the structural support 112 may be operably coupled to one or more of the center console 24, the working surface 40, the pivot block 64, and the support shaft 72. The structural support 112 may pivot with the working surface 40 as it is transitioned between the stowed position and the fully deployed position. Alternatively, more than one structural support 112 may be utilized in the center console 24 such that the working surface 40 is provided with support without being directly coupled to the structural support 112, see FIGS. 2 and 3 for exemplary embodiments of such an arrangement. In embodiments where the structural support 112 is directly coupled to the working surface 40, the structural support 112 may act as a rotational limit for the working surface 40. In other words, the structural support 112 may limit the extent to which the working surface 40 may pivot. For example, the structural support 112 may contact a side wall of the center console 24 when the working surface 40 is in the stowed position. Additionally, the structural support 112 may contact a front wall of the center console 24 when the working surface 40 is rotated to the fully deployed position. Accordingly, the structural support 112 may limit the rotational displacement (e.g. arc length) that the working surface 40 may rotate and/or travel through as the working surface 40 is transitioned between the stowed position and the fully deployed position.

Figure 11:
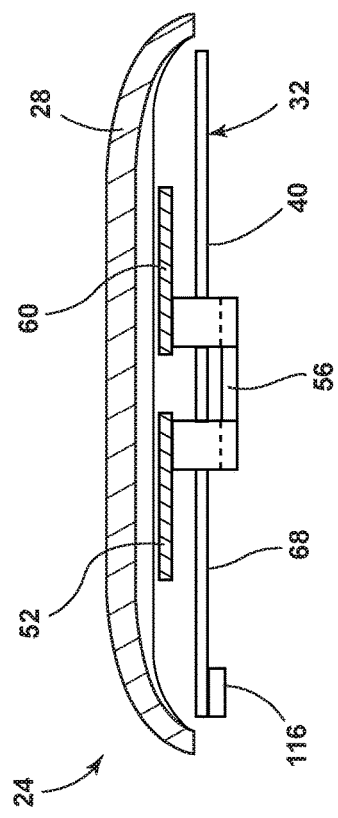
FIG. 11 is a front view of the lid of the center console, according to one embodiment.
Figure 12:
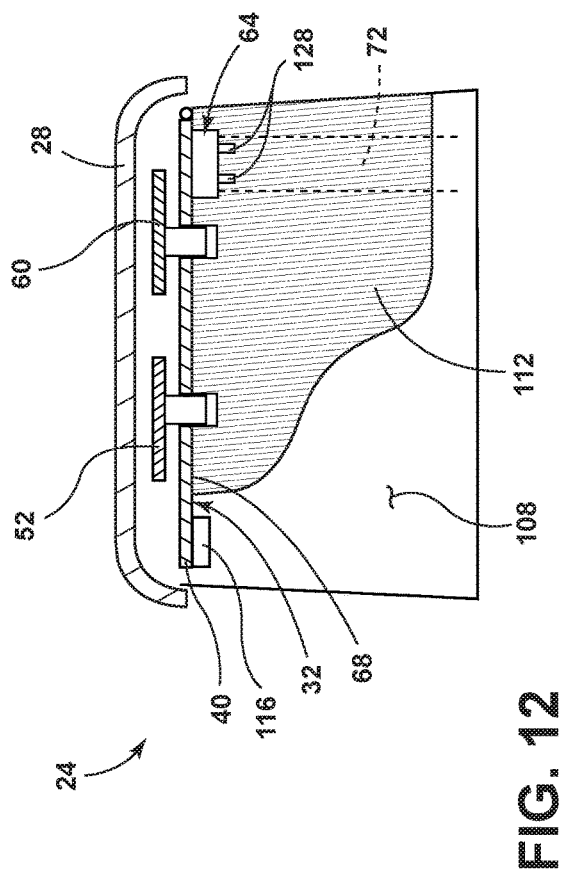
FIG. 12 is a front view of the lid of the center console, according to another embodiment.

Referring now to FIGS. 11 and 12, the lid 28 defines an upper extreme of the center console 24. The pivoting assembly 32 is positioned below the lid 28 and within the center console 24. The first release lever 52 and the second release lever 60 are positioned vehicle forward of the lid 28 and the pivoting assembly 32. The first release lever 52 and the second release lever 60 releasably engage with the latch 56. The tab 116 is operably coupled to the underside 68 of the working surface 40 and is accessible while the lid 28 is in the closed position and while the working surface 40 is in the stowed position. The structural support 112 may be operably and/or directly coupled to one or more of the center console 24, the working surface 40, the pivot block 64, and the support shaft 72.

Referring to FIGS. 13-14B, the pivot block 64 and the support shaft 72 are shown in further detail, according to various embodiments. The radially protruding portions 132 of the spring-loaded pins 128 extend radially outward relative to the center of the pivot block 64. The support shaft 72 includes receiving portions 144 that are configured to engage with the spring-loaded pins 128 on the pivot block 64. The receiving portions 144 may be contoured to correspond with the shape of the spring-loaded pins 128 that are received by the receiving portions 144. For example, the receiving portions 144 may include a central portion 148 that receives a shaft portion 152 of the spring-loaded pins 128. The receiving portions 144 may further include a radially extending region 156 that corresponds with and receives the radially protruding portions 132 of the spring-loaded pins 128.

Referring again to FIGS. 13-14B, a wall 160 of the radially extending regions 156 is shown as being vertical in FIGS. 14A and 14B, however it is contemplated that the wall 160 may be sloped so as to present the spring-loaded pins 128 with a surface that gradually decreases (FIG. 14A) or increases (FIG. 14B) in diameter. In such embodiments, the sloping of the wall 160 may actuate the spring-loaded pins 128 radially inward (FIG. 14A) or radially outward (FIG. 14B). Upon reaching a lower extreme of the wall 160, the radially protruding portions 132 of the spring-loaded pins 128 positively engage with the support shaft 72 to retain the pivot block 64 to the support shaft 72. Once the spring-loaded pins 128 have been inserted into the receiving portions 144, the pivot block 64 may be rotated about an axis defined by a geometric center of the support shaft 72. As the pivot block 64 rotates within the support shaft 72 the radially protruding portions 132 may pass through the channel 136 in the support shaft 72. The channel 136 may take the form of a circle within the support shaft 72 that corresponds in diameter with the radially extending region 156 of the receiving portions 144.

In some embodiments, the support shaft 72 may include a rotational puck 164 at an upper extreme of the support shaft 72. The rotational puck 164 may rotate independently from the remainder of the support shaft 72. In such embodiments, the pivot block 64 engages with the rotational puck 164 and the pivot block 64 and the rotational puck 164 rotate together as one when the working surface 40 (FIG. 12) is transitioned between the stowed position and the deployed position. The radially protruding portions 132 may positively engage with a ceiling 168 of the channel 136 such that the pivot block 64 is retained to the support shaft 72. In some embodiments, the radially protruding portions 132 extend radially inward toward the center of the pivot block 64 (FIG. 14B). In such embodiments, the channel 136 may take the form of a circle within the support shaft 72 that corresponds in diameter with the radially extending region 156 of the receiving portions 144. In addition to the positive engagement described above, or as an alternative to the positive engagement described above, it is contemplated that the pivot block 64 may be magnetic and the support shaft 72 may be made of a ferromagnetic material such that the pivot block 64 may be magnetically retained to the support shaft 72. While the spring-loaded pins 128 of the pivot block 64 have been shown as including two spring-loaded pins 128, it is contemplated that a single spring-loaded pin 128 or more than two spring-loaded pins 128 may be utilized without departing from the concepts disclosed herein.

Vehicles 20 are typically provided with center consoles 24 that may additionally serve as an armrest. These center consoles 24 often provide a storage compartment for a user, such as the main storage bin 108. Some vehicles 20 are provided with a working surface located in an interior 76 of the vehicle 20. However, the working surfaces that are typically provided in vehicles 20 require that a sacrifice of at least some of the functionality of the interior 76 of the vehicle 20 be made by the user. Provided herein is a working surface 40 that provides additional functionality to the interior 76 of the vehicle 20 without requiring a sacrifice of storage, comfort, or occupancy capabilities of the vehicle 20. Furthermore, the working surface 40 may be accessed and deployed by the user while the lid 28 is in either the open position or the closed position.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A center console for a vehicle comprising:
   a lid having a first release lever that releasably engages with a latch; and
   a pivoting assembly comprising a working surface that is deployable while the lid is in a closed position, the pivoting assembly being independently operable from the lid and having a second release lever that releasably engages with the latch.

2. The center console for a vehicle of claim 1, wherein the pivoting assembly further comprises:
   a storage tray that is forked at a forward extreme to receive the working surface when the working surface is in a stowed position, wherein the storage tray is pivotably coupled to said center console at a rearward end.

3. The center console for a vehicle of claim 1, further comprising:
   a pivot block operably coupled to an underside of the working surface and configured to releasably engage with a support shaft to permit opening of the pivoting assembly and rotational deployment of the working surface.

4. The center console for a vehicle of claim 1, further comprising:
   a structural support operably coupled to the underside of the working surface that rotates with the working surface when the working surface is transitioned between a stowed position and a deployed position.

5. The center console for a vehicle of claim 3, wherein the pivot block further comprises:
   one or more spring-loaded pins that releasably engage with the support shaft.

6. The center console for a vehicle of claim 3, wherein an underside of the pivot block is magnetic and the support shaft is made of a ferromagnetic material.

7. The center console for a vehicle of claim 5, wherein the spring-loaded pins comprise radially protruding portions that positively engage with a channel in the support shaft to retain the pivot block to the support shaft.

8. The center console for a vehicle of claim 3, wherein the support shaft is rotatable about an axis through a geometric center of the support shaft.

9. The center console for a vehicle of claim 1, wherein the lid further comprises:
   a supplemental storage area therein configured to retain items while the lid is transitioned between an open and the closed position.

10. A center console for a vehicle comprising:
    a lid;
    a pivoting assembly operably coupled to the lid, wherein the pivoting assembly comprises a working surface and a storage tray, and wherein the storage tray is forked at a forward extreme to receive the working surface in a stowed position; and
    a pivot block operably coupled to an underside of the working surface and configured to releasably engage with a support shaft.

11. The center console for a vehicle of claim 10, further comprising:
    a structural support operably coupled to the underside of the working surface that rotates with the working surface when the working surface is transitioned between the stowed position and deployed position.

12. The center console for a vehicle of claim 10, wherein the pivot block further comprises:
    one or more spring-loaded pins that releasably engage with the support shaft.

13. The center console for a vehicle of claim 12, wherein an underside of the pivot block is magnetic and the support shaft is made of a ferromagnetic material.

14. The center console for a vehicle of claim 13, wherein the spring-loaded pins comprise radially protruding portions that positively engage with a channel in the support shaft to retain the pivot block to the support shaft.

15. A center console for a vehicle comprising:
    a lid;
    a pivoting assembly operably coupled to the lid at an end, wherein the pivoting assembly comprises a working surface and a storage tray, and wherein the storage tray is forked at a forward extreme to receive the working surface in a stowed position, and wherein the working surface can remain in a deployed position when the lid and pivoting assembly are closed;
    a first release lever configured for releasable engagement with a latch;
    a second release lever configured to releasable engagement with the latch;
    a support shaft; and
    a pivot block operably coupled to an underside of the working surface and configured to releasably engage with the support shaft.

16. The center console for a vehicle of claim 15, wherein the pivot block further comprises:
    one or more spring-loaded pins that releasably engage with the support shaft.

17. The center console for a vehicle of claim 16, wherein an underside of the pivot block is magnetic and the support shaft is made of a ferromagnetic material.

18. The center console for a vehicle of claim 17, wherein the spring-loaded pins comprise radially protruding portions that positively engage with a channel in the support shaft to retain the pivot block to the support shaft.

\* \* \* \* \*